United States Patent [19]

Roseliep

[11] Patent Number: 5,635,808
[45] Date of Patent: Jun. 3, 1997

[54] METHOD AND SYSTEM FOR CONTROLLING THE MOTION OF A ROTARY DRIVE OF A ROTARY INDEX TABLE ASSEMBLY

[75] Inventor: Robert E. Roseliep, Grosse Pointe, Mich.

[73] Assignee: Utica Enterprises, Inc., Shelby Township, Mich.

[21] Appl. No.: 520,625

[22] Filed: Aug. 30, 1995

[51] Int. Cl.$^6$ .......................... G05B 19/18; F16D 71/00
[52] U.S. Cl. .......................... 318/638; 318/569; 318/632; 74/813 L; 192/141
[58] Field of Search .................. 318/560–696; 364/474.1–474.35; 250/201.1, 221; 74/813–826; 192/141–149

[56] References Cited

U.S. PATENT DOCUMENTS

| | | | |
|---|---|---|---|
| 3,507,169 | 4/1970 | Signer . | |
| 3,824,892 | 7/1974 | Bondie et al. . | |
| 3,941,014 | 3/1976 | Benjamin et al. . | |
| 4,159,658 | 7/1979 | Parkinson . | |
| 4,191,916 | 3/1980 | Zasio et al. | 318/640 |
| 4,315,199 | 2/1982 | Kyomasu et al. | 318/601 |
| 4,331,910 | 5/1982 | Kohzai et al. | 318/618 |
| 4,333,044 | 6/1982 | Blitchington | 318/636 |
| 4,425,537 | 1/1984 | Phillips et al. | 318/640 |
| 4,442,388 | 4/1984 | Phillips | 318/640 |
| 4,447,770 | 5/1984 | Shepherd | 318/618 |
| 4,455,512 | 6/1984 | Cornwell et al. | 318/135 |
| 4,456,863 | 6/1984 | Matusek | 318/572 |
| 4,494,060 | 1/1985 | Chitayat et al. | 318/568 |
| 4,561,771 | 12/1985 | Sugiura | 355/14 R |
| 4,568,171 | 2/1986 | Ikenoue | 355/8 |
| 4,653,739 | 3/1987 | Moore . | |
| 4,687,980 | 8/1987 | Phillips et al. | 318/640 |
| 4,754,208 | 6/1988 | Nakajima et al. | 318/574 |
| 4,807,338 | 2/1989 | Myles . | |
| 4,977,361 | 12/1990 | Phillips et al. | 318/640 |
| 5,030,901 | 7/1991 | Futami | 318/610 |
| 5,059,881 | 10/1991 | Fujita et al. | 318/630 |
| 5,064,044 | 11/1991 | Oketani et al. . | |
| 5,124,621 | 6/1992 | Kawamura et al. | 318/569 |
| 5,418,440 | 5/1995 | Sakaguchi et al. | 318/560 |
| 5,519,254 | 10/1996 | Teshima | 318/611 |

*Primary Examiner*—Paul Ip
*Attorney, Agent, or Firm*—Brooks & Kushman P.C.

[57] ABSTRACT

Method and system are provided for controllably driving a rotary drive of a rotary index table assembly utilizing a PLC which receives various sensor signals including a feedback signal from a resolver to generate a reference central signal which, in turn, is used by a positioning drive including an electric servomotor to drive the rotary drive. The positioning drive includes a servoamplifier and a microprocessor for generating commands for controlling the servoamplifier in response to the reference central signal. The PLC also controls a hydraulic control unit which controls the axial position of the index table relative to a base of the assembly.

7 Claims, 10 Drawing Sheets

METHOD AND SYSTEM FOR CONTROLLING THE MOTION OF A ROTARY DRIVE OF A ROTARY INDEX TABLE ASSEMBLY

CROSS-REFERENCE TO RELATED APPLICATIONS

This invention relates to U.S. Pat. No. 5,450,771, entitled "Rotary Index Table Assembly" and U.S. Pat. No. 5,542,317.

TECHNICAL FIELD

This invention relates to control methods and systems for controlling motion of a rotary drive of a rotary index table assembly for moving workpieces being processed.

BACKGROUND ART

Driving rotation of rotary index tables has previously been accomplished by the use of worm gear sets. For example, U.S. Pat. No. 3,941,014 Benjamin et al and U.S. Pat. No. 4,159,658 Parkinson disclose straight worm gear sets that rotatively drive associated rotary tables during index in association with crown gears that provide positioning after the rotation. Furthermore, machine table movement has previously been provided by double enveloping worm gear sets such as disclosed by U.S. Pat. No. 3,824,892 Bondie et al and, as disclosed by U.S. Pat. No. 4,653,739, has been utilized to provide rotary positioning of a workpiece table. Such double enveloping worm gear sets have surface-to-surface contact as opposed to line contact provided by straight worm gear sets and thus have greater capacity to provide rotational driving of greater loads for the same size unit. Rotational positioning for indexing has also been previously provided by polygonal type drive couplings such as disclosed by U.S. Pat. No. 3,507,169 Signer 10 wherein a rotary drive member having polygon surfaces distributes the driving force.

The Myles, U.S. Pat. No. 4,807,338, discloses a computer controlled hydraulic drive for an index table. The computer includes a motion controller for feeding control signals to an electrohydraulic proportional valve in accordance with a pre-selected program.

The Oketani et al., U.S. Pat. No. 5,064,044, discloses an indexing apparatus for a rotary table including a rack-pinion mechanism, an electric motor for driving a feed screw shaft and a feed nut engaging the feed screw shaft.

DISCLOSURE OF THE INVENTION

An object of the present invention is to provide an improved method and system for controlling the motion of a rotary drive of a rotary index table assembly.

In carrying out the above and other objects of the invention, a method is provided for controlling the motion of a rotary drive that rotates an index table relative to a base for indexing rotation about a rotational axis wherein the index table is also axially movable relative to the base to permit indexing rotation of the table. The method includes the steps of generating a home position signal based on a predetermined rotary position of the index table relative to the base and generating an axial position signal based on the axial position of the index table with respect to the base. The method also includes the steps of generating a feedback signal based on rotary position of the rotary drive, generating a reference control signal based on the home position, feedback and axial position signals and controllably driving the rotary drive based on the reference control signal.

Still further in carrying out the above objects and other objects of the present invention, a system is provided for controlling the motion of a rotary drive that rotates an index table relative to a base for indexing rotation about a rotational axis wherein the index table is also axially movable relative to the base to permit the indexing rotation of the index table. The system includes a home position sensor associated with the index table for generating a home position signal based on a predetermined rotary position of the index table and an axial position sensor for generating an axial position signal based on the axial position of the index table with respect to the base. The system also includes a positioning drive having an electric servomotor which has a rotary driveshaft for applying programmed motion to the rotary drive and a rotary position sensor associated with the driveshaft for generating a feedback signal based on the rotary position of the driveshaft. The system further includes a programmable controller coupled to the positioning drive, the home position sensor, the rotary position sensor and the axial position sensor to generate a reference control signal based on the home position, feedback and axial position signals, wherein the positioning drive is responsive to the reference control signal to accurately and quickly position the rotary drive.

The method and system of the present invention provide numerous advantages. For example, an acceleration and deceleration profile provided by the method and system enable a high cycling rate as well as good braking capability and great accuracy.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1A:
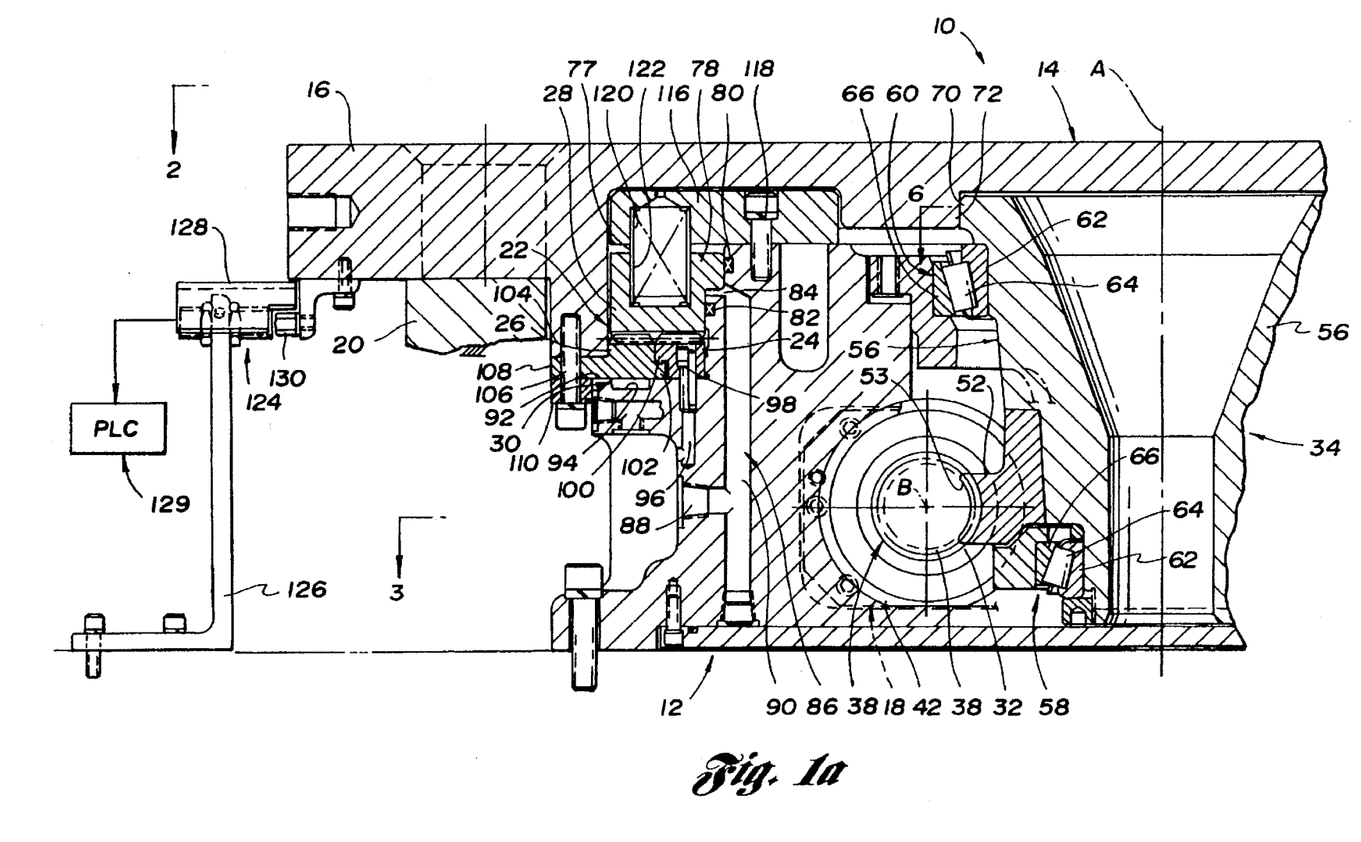
FIGS. 1a and 1b are respectively partial left and right elevational views taken in section through a rotary index table assembly controlled by the method and system of the present.
Figure 1B:
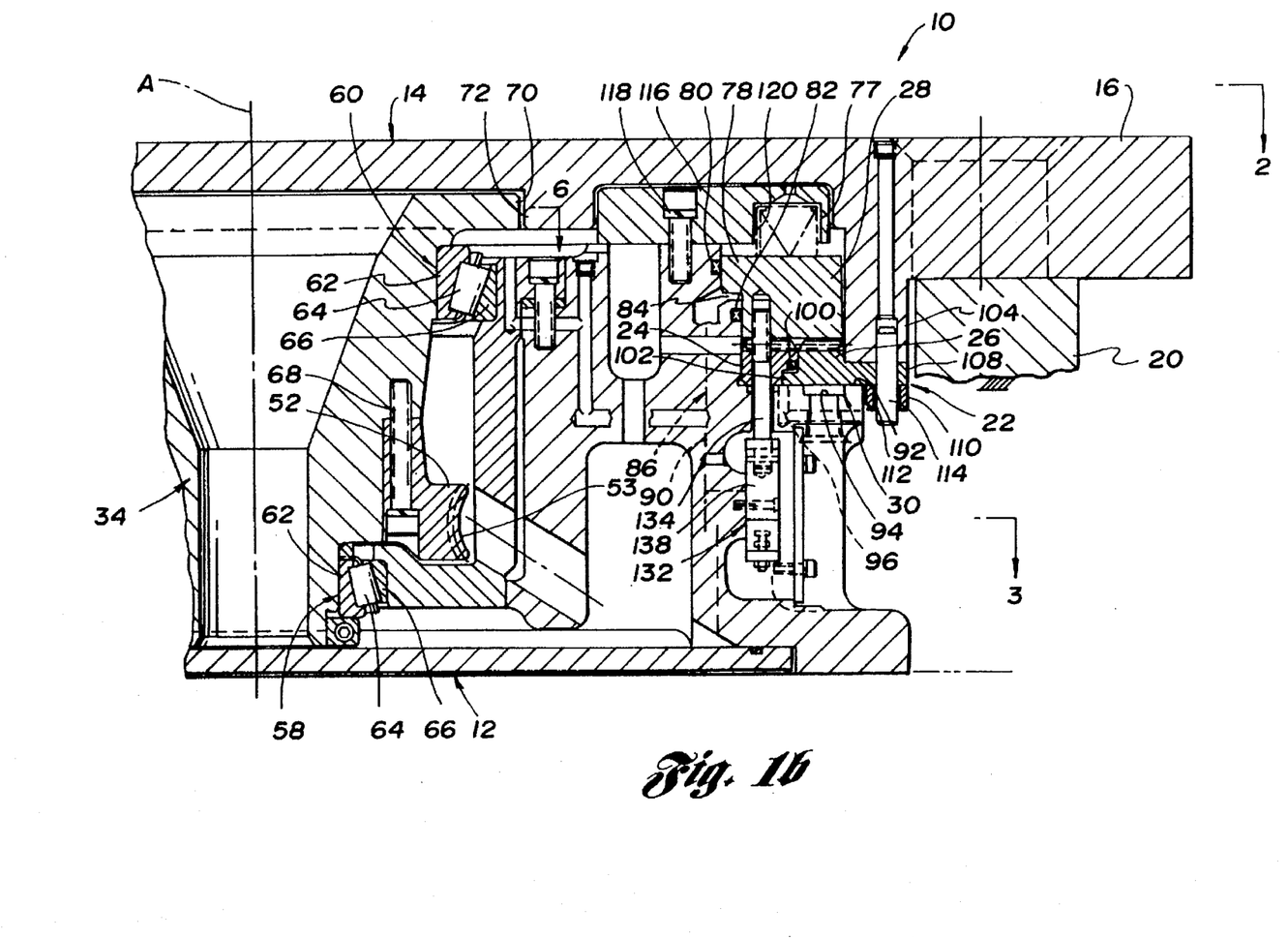
Figure 2A:
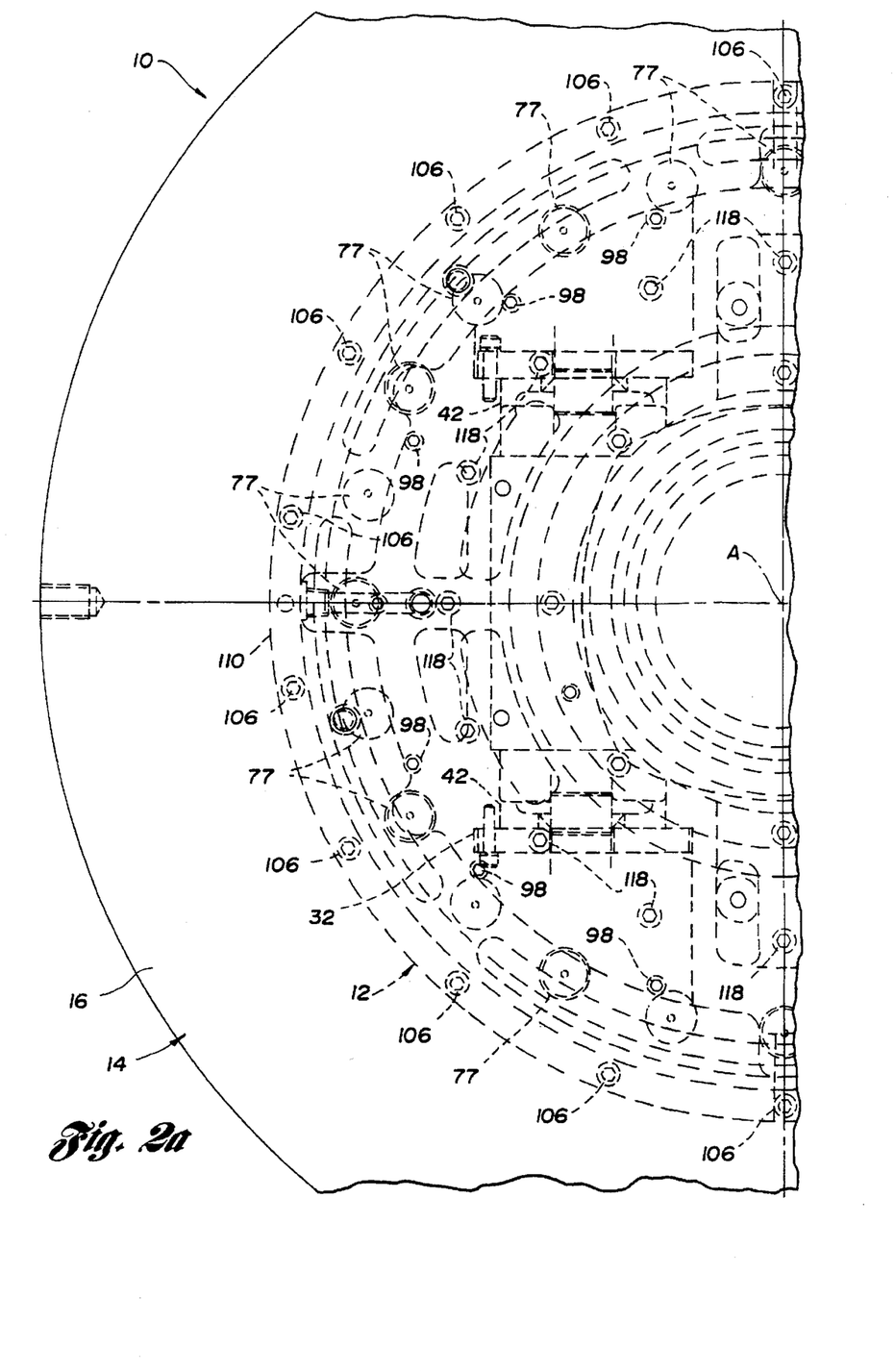
FIGS. 2a and 2b are respectively partial left and right top plan views taken along the direction of line 2—2 in FIGS. 1a and 1b through the table assembly.
Figure 2B:
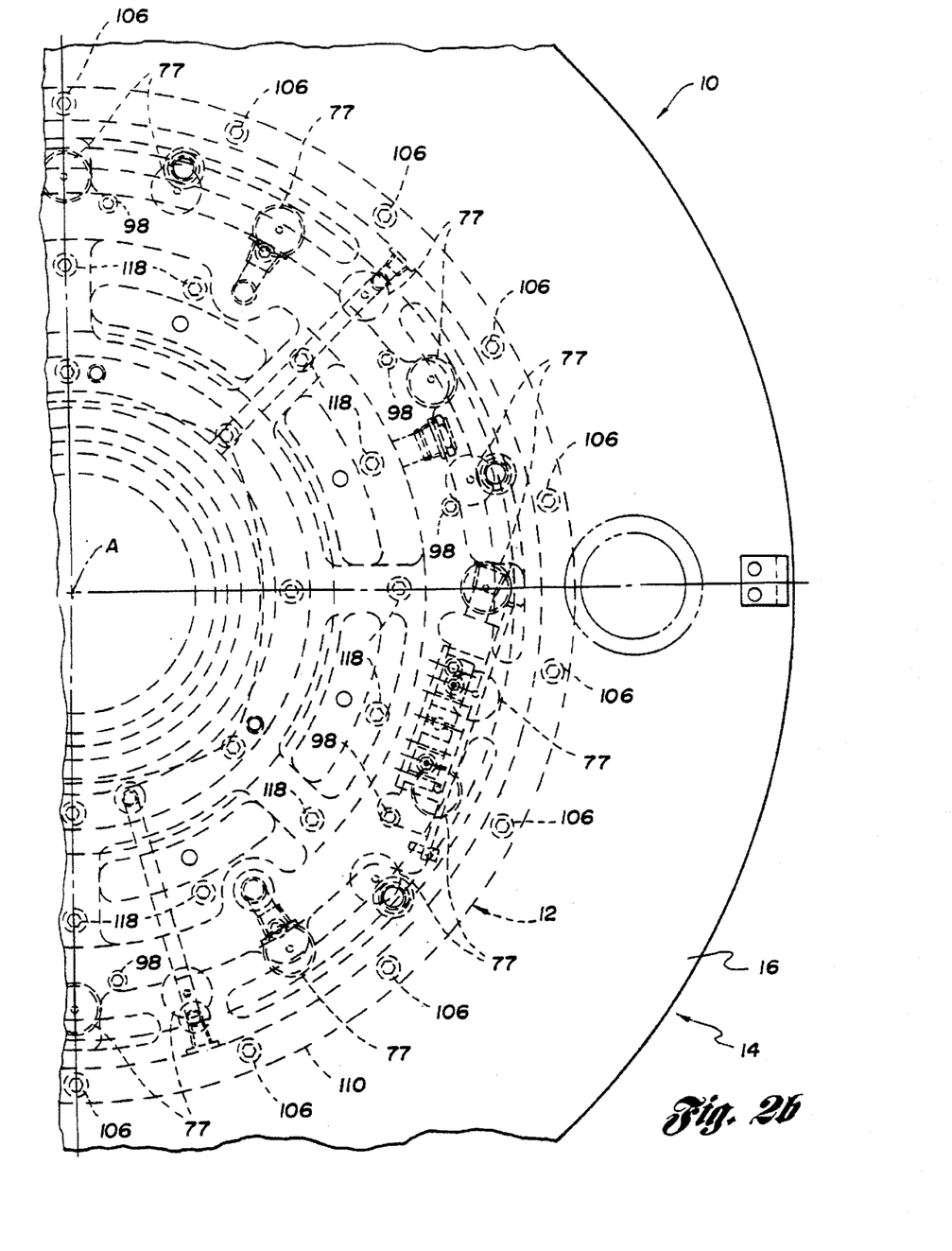
Figure 3A:
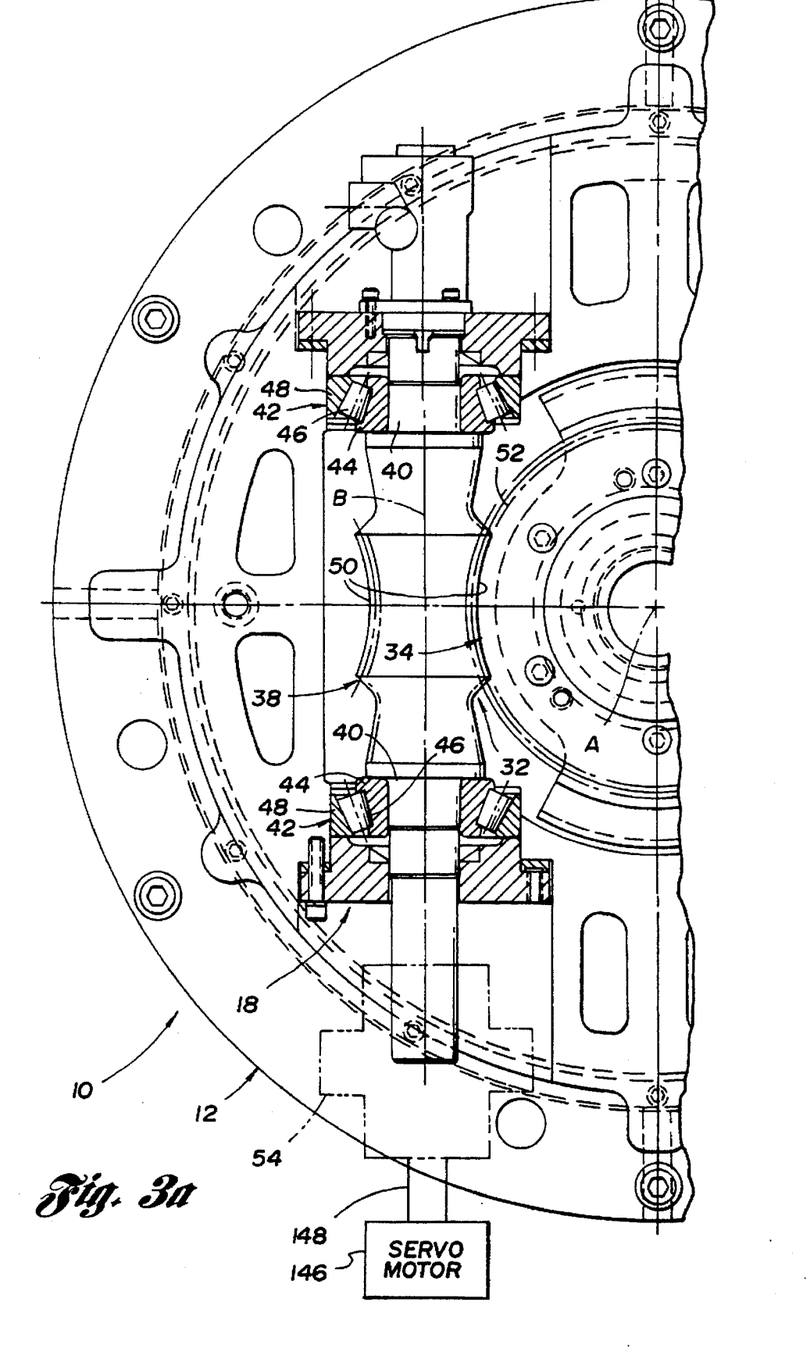
FIGS. 3a and 3b are respectively partial left and right views taken in section through the table assembly along the direction of line 3—3 in FIGS. 1a and 1b.
Figure 3B:
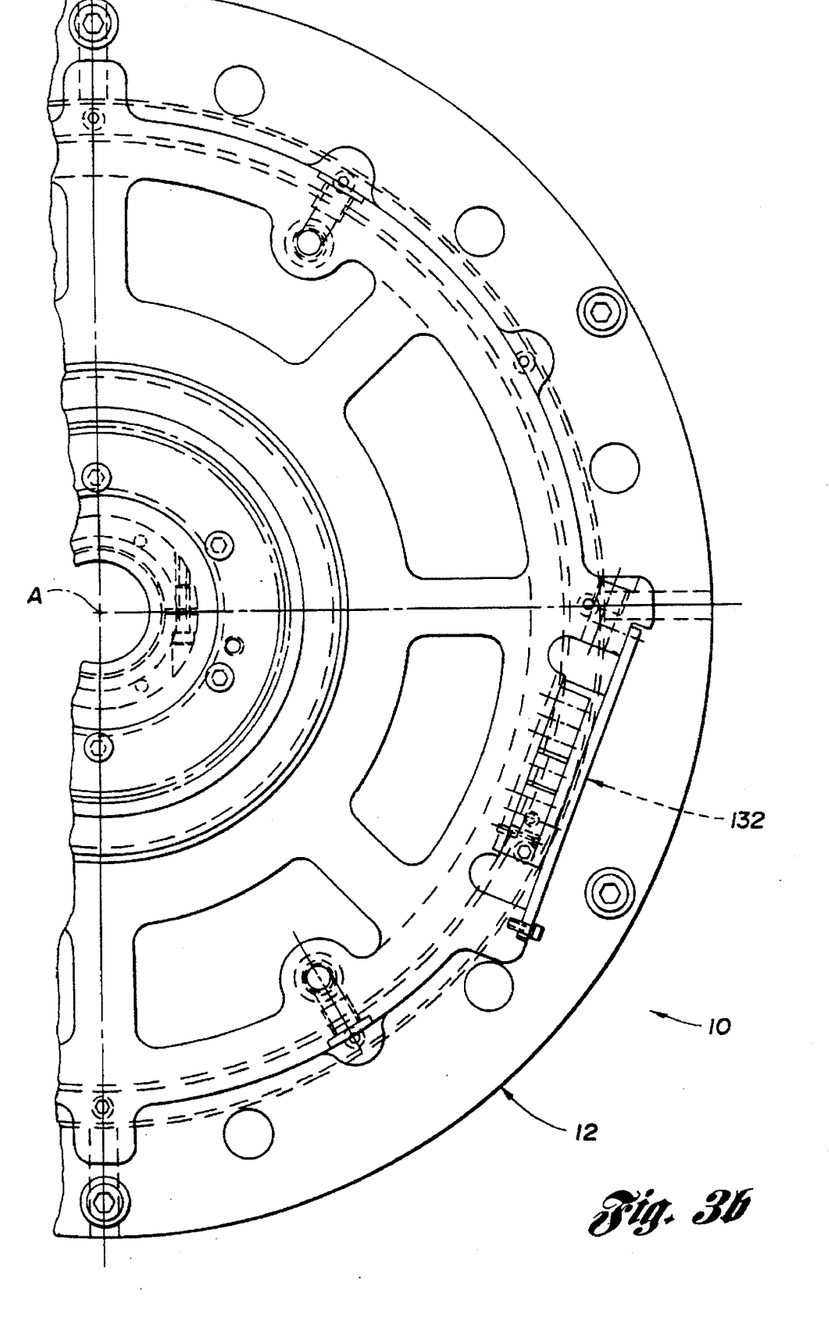

With reference to FIGS. 1a and 1b, a rotary index table assembly controlled by the method and system of the present invention is generally indicated by 10 and includes a base 12 and a rotary index table 14 having a central rotational axis A and an outer periphery 16 which has a round shape as best illustrated in FIGS. 2a and 2b. A rotary drive 18 of the table assembly is illustrated in FIGS. 1a and 3a and operates to rotate the index table 14 on the base 12 for indexing rotation about the rotational axis A. Stationary supports 20 are suitably mounted in a fixed relationship relative to the base 12 and support the periphery 16 of the table to prevent movement thereof during machining by machining units 21 (i.e., FIG. 10) of a workpiece supported on the table by an unshown holder.

Figure 4:
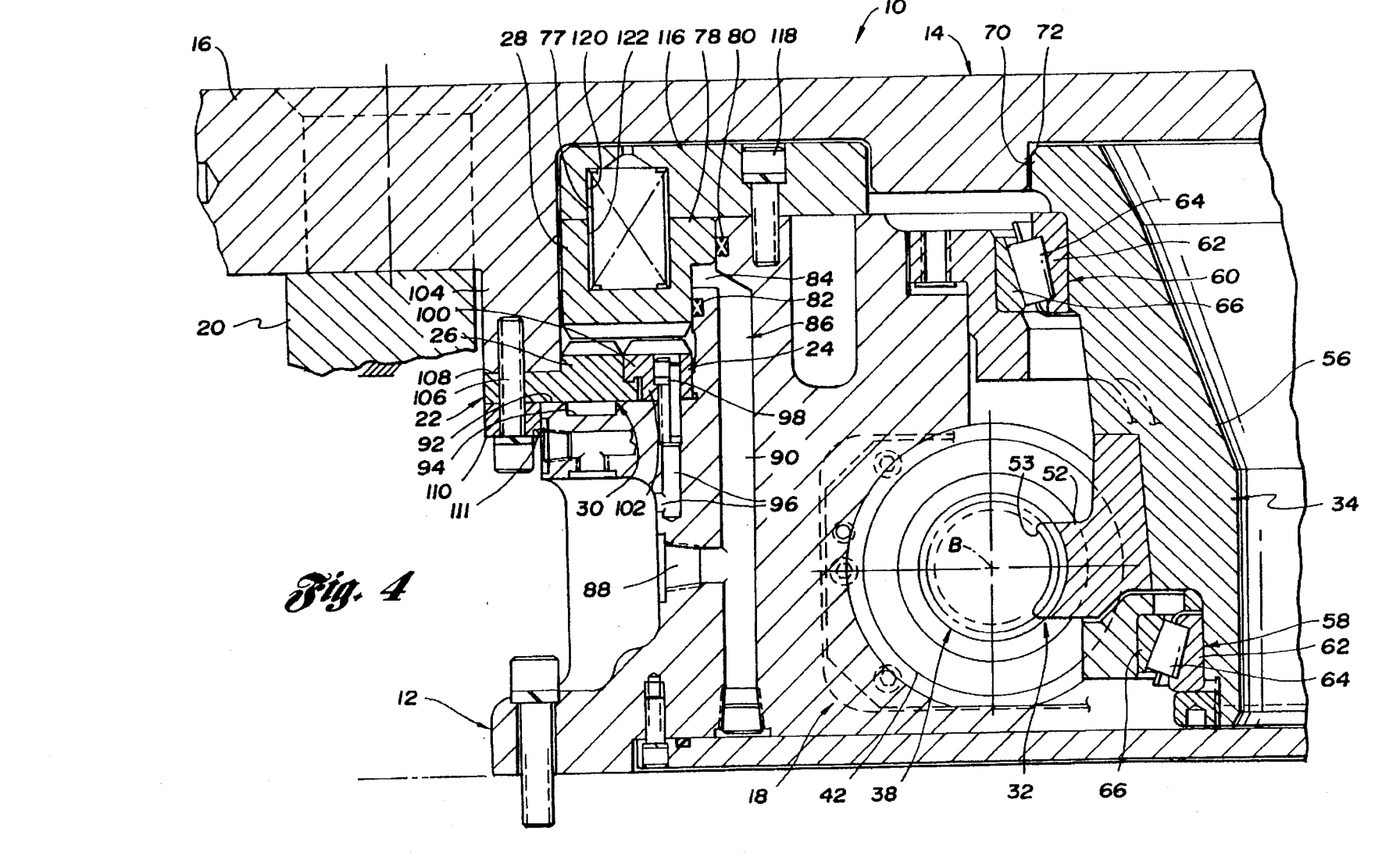
FIG. 4 is an enlarged view of a portion of the left side of the table assembly shown in FIG. 1a and illustrates an annular positioning mechanism in a disengaged condition so as to allow indexing rotation of an index table of the assembly.
Figure 5:
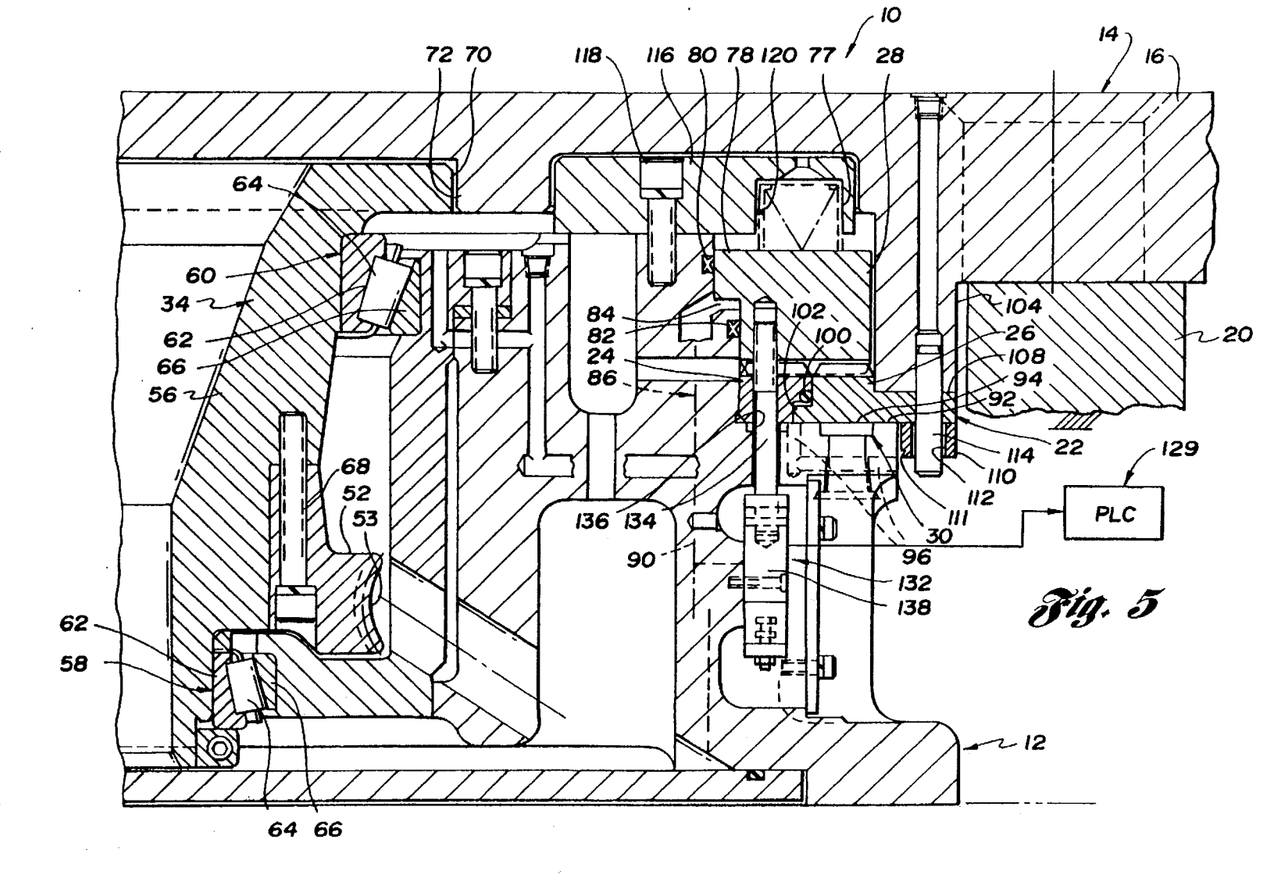
FIG. 5 is an enlarged partial view illustrating a portion of the right side of the table assembly shown in FIG. 1b but with the annular positioning mechanism in an engaged condition to provide positioning of the table assembly.

As illustrated in FIGS. 1a and 1b as well as in FIGS. 4 and 5, the table assembly 10 includes an annular positioning mechanism 22 including a base mounted crown gear 24, a table mounted crown gear 26, and a movable crown gear 28. Each of these crown gears has an annular shape with vertically projecting teeth. More specifically, the base and table mounted crown gears 24 and 26 have teeth that project upwardly, while the movable crown gear 28 has teeth that project downwardly. During operation of the table assembly as is hereinafter more fully described, the movable crown gear 28 is moved upwardly as shown in FIG. 4 so that it is disengaged from the base mounted crown gear 24 and the table mounted crown gear 26 to permit the indexing rotation of the table 14. After the indexing, the movable crown gear 28 is moved downwardly into engagement with the base mounted crown gear 24 and table mounted crown gear 26 to locate the table with respect to the base. The teeth of the crown gears 24, 26 and 28 extend radially with respect to the rotational axis A and taper inwardly so that the engagement of the movable crown gear 28 with the table mounted crown gear 24 and with the base crown gear 26 provides centering of the table as well as rotational positioning of the table with respect to the rotational axis after each indexing rotation.

As illustrated in FIGS. 1a and 1b as well as in FIGS. 4 and 5, the table assembly 10 also includes an air bearing 30 that supports the table on the base during the indexing rotation and the positioning of the table by the annular positioning mechanism 22. This support of the table by the air bearing 30 provides more accurate table positioning by removing weight of the table from the supports 20 located below the table periphery 16. It should be noted that the enclosed table positioning can be achieved by air pressure that counteracts less than the entire weight of the table, but best results are achieved when the air pressure is sufficiently great to lift the entire weight of the table.

Figures 6, 7, 8:
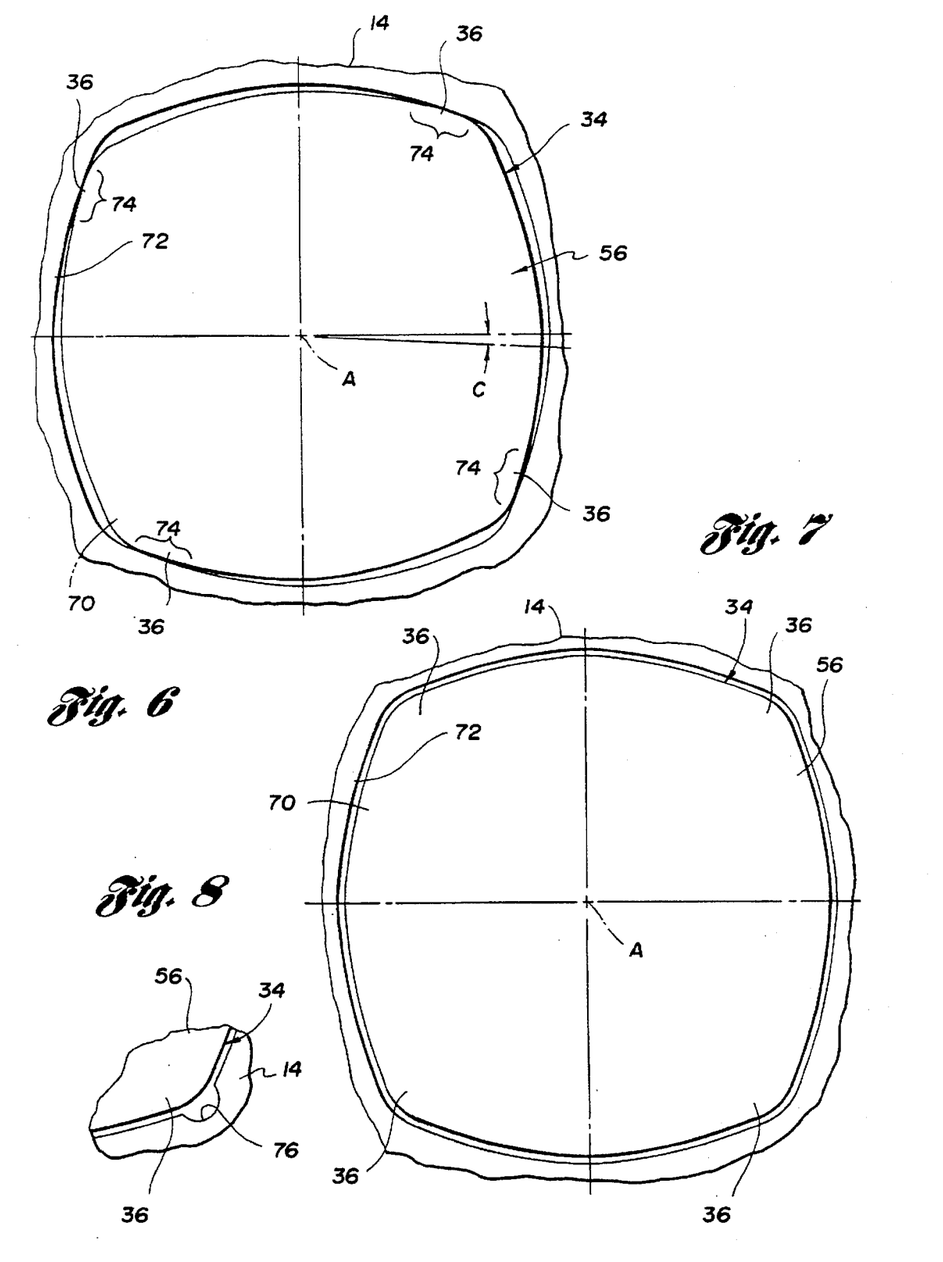
FIG. 6 is a schematic plan view taken along the direction of line 6—6 in FIGS. 1a and 1b and illustrates a polygonal drive coupling upon rotatively driving of the table for indexing.
FIG. 7 is a schematic plan view similar to FIG. 6 but illustrating the coupling after indexing rotation and positioning of the table.
FIG. 8 is a partial view that illustrates a modified construction of the drive coupling.

As illustrated by combined reference to FIGS. 1a and 3a, the rotary drive 18 includes a double enveloping worm gear set 32 that rotates the table 14 as is hereinafter more fully described. Rotary drive 18 also includes a polygonal drive coupling 34 which, as shown in FIGS. 6 and 7, has a plurality of drive lobes 36 that rotate the table 14. Provision of both the double enveloping worm gear set 32 and the polygonal drive coupling 34 provides a relatively compact unit that is nevertheless capable of transmitting relatively large torque loads. This results because of the fact that both the double enveloping worm gear set 32 and the polygonal drive coupling 34 have surface-to-surface contact in transmitting the driving force as compared to line contact involved with other types of straight worm gear sets and other rotary couplings.

As illustrated in FIG. 3a, the double enveloping worm gear set 32 includes a worm 38 having opposite ends 40 which are respectively supported by a pair of anti-friction bearing assemblies 42. Each bearing assembly 42 has an inner race 44 that supports the associated worm end 40, tapered bearing elements 46 that roll around the inner race 44, and an outer race 48 that is supported on the base with the tapered bearing elements rollingly supported thereby so as to thus support the worm for rotation about an associated axis B. Between its ends 40, the worm 38 has an inwardly curved shape 50 that extends about the rotational axis A to provide the one enveloping function of the worm gear set. In addition, the worm gear set includes a worm gear 52 that is rotatably supported about the rotational axis A as is hereinafter more fully described to provide rotational driving of the table 14. This worm gear 52 as shown in FIGS. 1a and 4 has a curved shape 53 about the worm axis B so as to provide the other enveloping function of the worm gear set. A suitable schematically illustrated coupler or connection 54 shown in FIG. 3a provides rotational driving of the worm 38 by an electric motor such that the worm rotates the worm gear 52 to rotate the table during the indexing cycle as is hereinafter more fully described.

As best illustrated by combined reference to FIGS. 1a and 1b, the polygonal drive coupling 34 includes a coupling member 56 which is rotatively supported on the base 12 by lower and upper antifriction bearing assemblies 58 and 60, respectively. Each of these bearing assemblies includes an associated inner race 62 that is mounted by an associated bearing seat of the coupling member 56, tapered bearing elements 64 that roll about the inner race 62 around rotational axis A, and an outer race 66 that is mounted by the base 12 such that the coupling member is thus rotatably supported about rotational axis A. Worm gear 52 is secured to the coupling member 56 by a plurality of circumferentially spaced bolts 68, only one of which is illustrated in FIG. 1b. This securement is located adjacent the lower antifriction bearing assembly 58 in a spaced relationship from the upper antifriction bearing assembly 60. Above the upper antifriction bearing assembly 60, the coupling member 56 includes a drive portion 70 that is located within a downwardly extending driven portion 72 of the table 14. As illustrated in FIGS. 6 and 7, the drive portion 70 of the coupling member 56 includes the drive lobes 36 of the drive coupling and, as shown, there are four such drive lobes. The driven portion 72 of the table has a slightly larger size than the coupling member drive portion 70 as best shown in FIG. 7 so as to thus allow both radial and circumferential positioning of the table by the positioning member as was previously described and as will hereinafter be more fully described. Rotational driving of the coupling member 56 by the rotary drive previously described rotates the driving portion 70 a small angle C before there is any engagement of the drive lobes 36 with the driven portion 72. This free movement results from the fact that, as mentioned above, the driving portion 70 has a smaller size than the table driven portion 72. After such free movement, the drive lobes 36 of the driving portion 70 engage the table driven portion 72 with surface-to-surface contact as shown at areas 74 that are spaced at 90° intervals from each other about the rotational axis A. This distribution of the driving force allows a relatively large torque to be transmitted by a relatively compact coupling construction.

Cooperation of the double enveloping worm gear set 32 and the drive coupling 34 with the polygonal drive lobes 36 thus provides a relatively compact rotary drive that is nevertheless capable of transmitting relatively large torques during the table indexing while still permitting the table positioning in association with the positioning mechanism 22 and air bearing 30 previously described.

As illustrated in FIG. 8, the driven portion 72 with the lobe construction shown can be manufactured more easily when provided with reliefs 76 adjacent the lobes 36.

Figure 10:
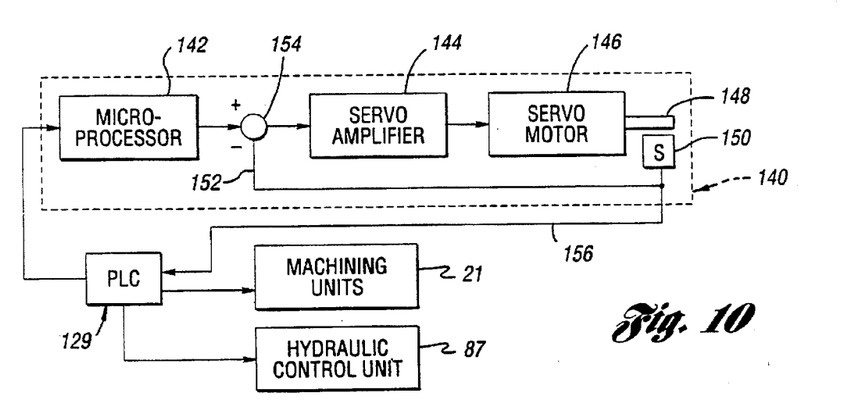
FIG. 10 is a block diagram of the positioning drive of the system.

With combined reference to FIGS. 1a, 1b, 2a, 2b, 4 and 5, the annular positioning mechanism 22 that positions the table 14 in association with the air bearing 30 includes a plurality of springs 77 that are spaced circumferentially around the rotational axis A and bias the movable crown gear 28 into engagement with the base mounted crown gear 24 and the table mounted crown gear 26. As best illustrated in FIGS. 4 and 5, the movable crown gear 28 includes an annular piston portion 78 that is slidably engaged in a sealed relationship with an upper annular seal 80 on the base 12. A lower annular seal 82 is slidably engaged in a sealed relationship with the movable crown gear 28 at a location below the piston portion 78 to thus cooperate with the upper seal in providing an annular piston chamber 84. A hydraulic circuit 86 having an inlet 88 shown in FIGS. 1a and 4 and having a passage 90 that feeds the pressurized hydraulic fluid to the annular piston chamber 84 thereby moves the movable crown gear 28 against the bias of the springs 77. The hydraulic circuit 86 is controlled by a hydraulic control unit 87 as illustrated in FIG. 10. This movement of the movable crown gear 28 provides disengagement thereof with the base mounted crown gear 24 and the table mounted crown gear 26 to permit the indexing rotation of the table 14 under the impetus of the rotary drive previously described.

As best illustrated in FIG. 4, the air bearing 30 includes an annular bearing surface 92 which is part of the base 12 and faces upwardly. The table mounted crown gear 26 is slidably supported by the annular bearing surface 92 which has an annular recess 94 to which pressurized air is supplied to support the table on the base for the indexing rotation and for positioning as the movable crown gear 28 is engaged with the base mounted crown gear 24 and the table mounted crown gear 26. The pressurized air flows both outwardly and inwardly along bearing surface 92 as a film for supporting the table. The air is easily exhausted to the environment at the outer side of bearing surface 92 and is exhausted at the inner side of the bearing surface through passages 96 in the base 12 to the environment. Good results are achieved when the air film that flows over bearing surface 92 is about 3 to 5 thousandths of an inch thick and thus supports the entire weight of the table.

After the indexing and positioning, it is also desirable for the air bearing 30 to continue to supply pressurized air but at a lower level so that there is continual air flow that prevents dust, machining coolant and any other foreign matter from entering the table assembly at the bearing surface 92. The lower pressure air flow that continues between the indexing cycles also provides a continual cleaning action of the bearing surface 92. Satisfactory results have been achieved with the higher pressure air being supplied at approximately fifty pounds per square inch, of pressure and with the lower pressurized air being supplied at a pressure of approximately five pounds per square inch, the magnitudes of which can be varied to account for the table weight and other characteristics of the particular table. It should also be appreciated that while it is most preferable to utilize atmospheric air, it is also possible for the air bearing to use another gas such as, for example, nitrogen.

As best illustrated in FIG. 4, the base mounted crown gear 24 is secured to the base 12 by a plurality of circumferentially spaced bolts 98, only one of which is shown. This base mounted crown gear 24 also has a stop 100 that limits upward movement of the table mounted crown gear 26 under the impetus of the pressurized air from the air bearing to about twenty thousandths of an inch. More specifically, the stop 100 has an annular shape that projects radially above an annular stop 102 on the table mounted crown gear 26. Table 14 includes an annular flange 104 that projects downwardly and has the crown gear 26 mounted thereon and secured by a plurality of circumferentially spaced bolts 106, only one of which is shown. More specifically, the table mounted crown gear has a flange 108 that projects radially outward with the bolts 106 extending upwardly through associated holes in this flange for securement to the downwardly projecting table flange 104. Bolts 106 also extend through and mount an oil drip member 110 of an annular shape. This oil drip member 110 as shown in FIGS. 4 and 5 has an annular notch 111 that prevents machining coolant from wicking upwardly toward the outer extremity of the bearing surface 92. As illustrated in FIG. 1b, drip member 110 also has circumferentially spaced vertical holes 112, only one shown, receiving downwardly projecting guide pins 114 that extend downwardly from the table flange 104 through associated holes in the flange 108 of the table mounted crown gear 26 to thereby facilitate the assembly.

With reference to FIGS. 1a and 1b, the table 14 as described above includes the annular flange 104 on which the table mounted crown gear 26 is secured, and the base mounted crown gear 24 is mounted on the base 12 within the confines of the table mounted crown gear. Furthermore, the piston portion 78 of the movable crown gear 28 extends inwardly toward the rotational axis and is located inwardly from the base mounted crown gear 24. Furthermore, the springs 77 that bias the movable crown gear 28 are located outwardly from the piston portion 78 thereof in alignment with both the base mounted crown gear 24 and the table mounted crown gear 26. More specifically, the base 12 has an annular ring 116 that is secured by bolts 118 to the rest of the base and projects radially outward from the rotational axis A above the movable crown gear 28. Springs 77 are of the helical type and have upper ends received within downwardly opening holes 120 spaced circumferentially about the base ring 116. Lower ends of the springs 77 are received within upwardly opening holes 122 spaced circumferentially about the movable crown gear 28 to thus provide the downward bias of the movable crown gear into engagement with the base and table mounted crown gears 24 and 26.

As illustrated in FIG. 1a, the table assembly 10 also includes a sensor assembly 124 for detecting when the table 14 has rotated to its home position. More specifically, this sensor assembly 124 includes a stationary support member 126 mounted adjacent the table base 12 in a fixed predetermined position and having an upper end on which a home position sensor 128 such as a proximity sensor is mounted and electrically connected to a programmable controller such as a PLC, generally indicated at 129. The periphery 16 of the table 14 has a sensor member 130 positioned at a home position of the table 14. Thus, positioning of the table 14 by the rotary drive previously described at a predetermined home position is sensed by the sensor assembly 124 which, in turn, generates a home position signal. The PLC 129 resets itself to rid itself of accumulated errors in response to the home position signals.

As illustrated in FIG. 5, the table assembly 10 also includes a sensor assembly 132 for detecting whether the positioning mechanism 22 is in the crown gear engaged condition or disengaged condition. More specifically, this sensor assembly 132 includes a sensor member 134 that has an upper end secured to the movable crown gear 28 and that extends downwardly through a hole 136 in the base mounted crown gear 24 to an axial position sensor 138, which is electrically connected to the PLC 129, mounted on the base 12. Upward and downward movement of the sensor member 134 along with the movable crown gear 128 is thus sensed by the sensor 138 which, in turn, generates an axial position signal based on the axial position of the index table with respect to the base.

Figure 9:
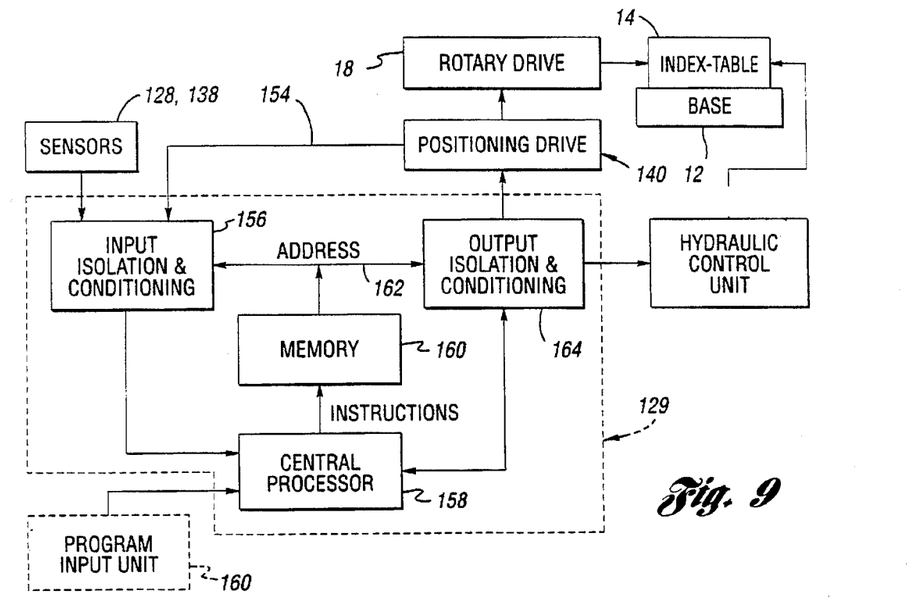
FIG. 9 is a block diagram of a system including a PLC for controlling the motion of the rotary drive of the assembly.

Referring now to FIGS. 9 and 10, the control system of the present invention also includes a positioning drive, generally indicated at 140. The positioning drive 140 includes a programmed microprocessor 142 for receiving a reference control signal from the PLC 129 for, in turn, generating commands for controlling a servoamplifier 144. In turn, the servoamplifier 144 supplies controlled power to a servomotor 146, as also illustrated in FIG. 3a. A rotary output drive-shaft 148 of the servomotor 146 is coupled by the connection 54 to the rotary drive 18 to rotate therewith.

A rotary position sensor or resolver 150 generates a feedback signal along a line 152 based on the rotary position of the driveshaft 148. The feedback signal is provided along the line 152 to a junction 154 in order to provide feedback in a well known fashion within a feedback or servoloop.

Also, the feedback signal is fed back along a line 156 to the PLC 129, as illustrated in FIGS. 9 and 10. In particular, the feedback signal along line 156 is processed by input isolation and conditioning circuits 156 of the PLC 129. Preferably, the PLC 129 is of a conventional design and also includes a central processor 158 which receives the isolation and conditioned signals from the sensors 128, 138 and 150 so that the central processor 158 can process the signals. The central processor 158 is coupled to a memory 160 to provide addresses along a line 162 so that the central processor 158 can selectively input signals from the sensors 128, 138 and 150.

The PLC 129 also includes output isolation and conditioning circuits 164 which properly isolate and condition a reference control signal to the positioning drive 140 and, in particular, to the microprocessor 142.

Figure 11:
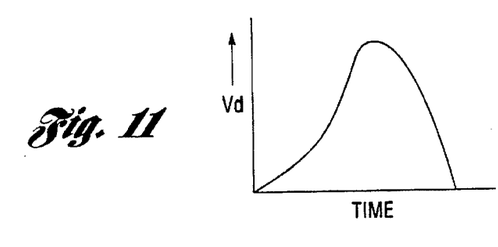
FIG. 11 is a graph illustrating the accel/decel shape for the motion of the rotary drive.

Referring now to FIG. 11, based on the various sensor input signals from the sensors 128, 138 and 150, the PLC 129 provides sequential control signals to the positioning drive 140 as well as control signals to the machining units 21 and to the hydraulic control unit 87 so that the rotary drive 18 and, consequently, the index table is driven between machining stations according to the acceleration/deceleration profile of FIG. 11. FIG. 11 generally shows unsymmetrical mod-sine ramps for acceleration and deceleration. The mod-sine ramps enter acceleration more smoothly, use more peak torque, enter the constant velocity part of the index more smoothly and reduce index maximum velocity. An index is a complete motion sequence that reaches a pre-programmed distance or position. This motion sequence is a combination of a programmed velocity, acceleration time to a programmed velocity, a deceleration time from the index velocity and a final distance or position.

Preferably, the positioning drive 140 comprises an FX positioning drive generally available from Emerson Electric Company of Chanhassen, Minn., United States of America, and having drive model No. DX-M6200. In general, the positioning drive 140 provides a number of different moves or indexes that can be pre-programmed and stored in non-volatile memory of the microprocessor 142. Each index provides a complete unique motion sequence from start to finish. Commands to start these indexes plus other commands such as STOP, JOG and HOME are input from the PLC 129.

The PLC 129 may be programmed from a program input unit 160 as indicated in FIG. 9. After programming the PLC 129, the program input unit 160 may be removed. The program input unit 160 may be an IBM personal computer or compatible PC.

An incremental index which is utilized with the present method and system moves the servomotor 146 a specified distance in the direction programmed in index set-up regardless of starting position.

The servo motor 146 utilized has a maximum continuous operating speed of 3000 RPM, continuous stall torque of 200 pound—inches and a peak torque of 400 pound—inches. Also, the motor has a motor inertia of 0.0192 pound—inches-second$^2$.

While the best mode for carrying out the invention has been described in detail, those familiar with the art to which this invention relates will recognize various alternative designs and embodiments for practicing the invention as defined by the following claims.

What is claimed is:

1. A method for controlling the motion of a rotary drive that rotates an index table relative to a base for indexing rotation about a rotational axis wherein the index table is also axially movable relative to the base to permit the indexing rotation of the table, the method comprising the steps of:

generating a home position signal based on a predetermined rotary position of the index table;

generating an axial position signal based on axial position of the index table with respect to the base;

generating a feedback signal based on rotary position of the rotary drive;

processing the home position, axial position and feedback signals to generate a reference control signal; and controllably driving the rotating drive based on the reference control signal.

2. A system for controlling the motion of a rotary drive that rotates an index table relative to a base for indexing rotation about a rotational axis wherein the index table is also axially movable relative to the base to permit the indexing rotation of the table, the system comprising:

a home position sensor for generating a home position signal based on a predetermined rotary position of the index table;

an axial position sensor for generating an axial position signal based on the axial position of the index table with respect to the base;

a positioning drive including an electric servomotor having a rotary driveshaft for applying programmed motion to the rotary drive and a rotary position sensor for generating a feedback signal based on the rotary position of the driveshaft; and a programmable controller coupled to the positioning drive, the home position sensor, the rotary position sensor and the axial position sensor to generate a reference control signal based on the home position, feedback and axial position signals, wherein the positioning drive is responsive to the reference control signal to accurately and quickly position the rotary drive.

3. The system as claimed in claim 2 wherein the positioning drive includes a servoamplifier and a microprocessor responsive to the reference control signal for generating commands for controlling the servoamplifier wherein the servoamplifier supplies control power to the servomotor.

4. The system as claimed in claim 2 further comprising a hydraulic control unit coupled to the programmable controller wherein the hydraulic control unit is responsive to a hydraulic control signal from the programmable controller to control the axial position of the index table with respect to the base.

5. The system as claimed in claim 2 wherein the rotary drive includes a double enveloping worm gear set that rotates the table.

6. The system as claimed in claim 2 wherein the rotary drive includes a polygonal drive coupling having a plurality of drive lobes that rotate the table.

7. The system as claimed in claim 2 wherein the rotary drive includes a double enveloping worm gear set, and a polygonal drive coupling driven by the double enveloping worm gear set having a plurality of drive lobes that rotate the table.

* * * * *